Jan. 31, 1939.　　　　B. L. SMITH　　　　2,145,321
SYNCHRONIZING TESTER
Filed April 28, 1938　　　2 Sheets-Sheet 1
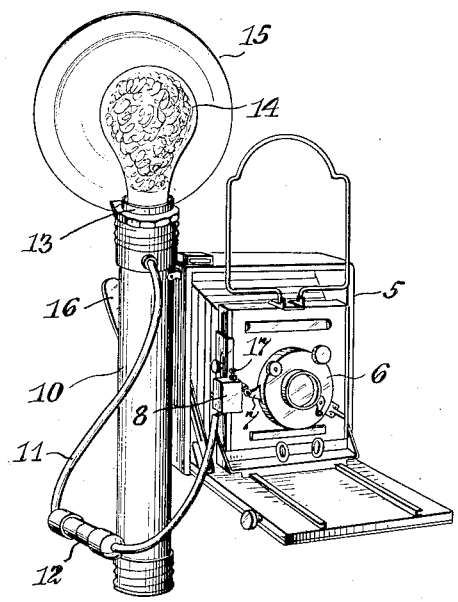
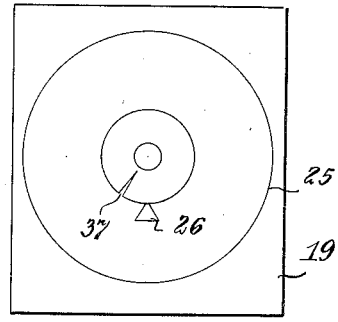
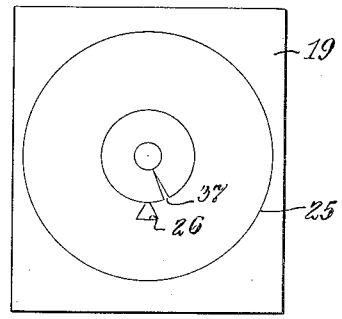
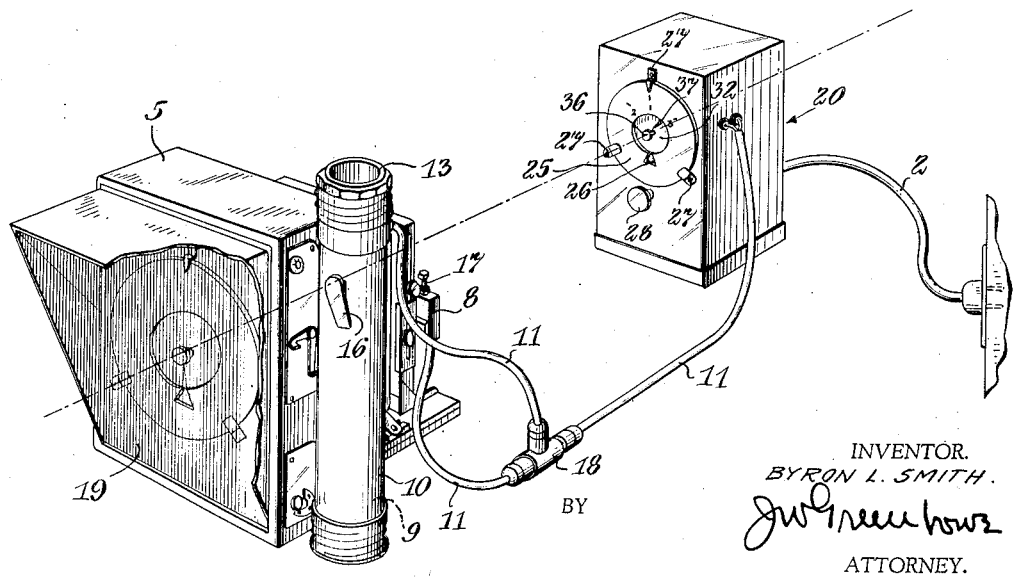
INVENTOR.
BYRON L. SMITH.
ATTORNEY.

INVENTOR.
BYRON L. SMITH
ATTORNEY.

Patented Jan. 31, 1939

2,145,321

UNITED STATES PATENT OFFICE 2,145,321

SYNCHRONIZING TESTER

Byron L. Smith, Spring Valley, N. Y., assignor to Samuel Mendelsohn, New York, N. Y.

Application April 28, 1938, Serial No. 204,919

5 Claims. (Cl. 67—29)

The present invention relates to a testing device and particularly to such a device for checking the accuracy of synchronization speed between a camera synchronizer and a camera shutter.

In the art of photography it is now well known to employ photoflash lamps for supplying instantaneous illumination and that for successful pictures the camera shutter must be fully opened at the peak of intensity of the illumination emanating from the photoflash lamp. To accomplish the proper timing between maximum shutter opening and peak intensity various types of synchronizers are utilized. One such synchonizing mechanism is shown and described in the copending application of Samuel Mendelsohn Serial No. 101,782, filed September 21, 1936, the assignee of the present invention.

Inasmuch as there is always a slight variance in the speed of movement between the shutters of cameras it is essential that a synchronizing mechanism, when utilized with a given camera shutter, be adjusted with each particular shutter so as to obtain absolute synchronization. Once synchronization has been established the mechanism will remain in this condition for a long time unless subjected to considerable shocks and jars.

However, particularly in instances of newspaper photography, where cameras as a matter of fact do receive abusive treatment, the synchronizing mechanism gets out of adjustment. To again obtain absolute synchronization it has heretofore been necessary to return the synchronizer together with the camera to the manufacturer for rechecking and adjustment.

It is the primary object of the present invention to provide a testing mechanism for rapidly testing the accuracy of synchronizing speeds between a camera shutter and a synchronizing mechanism which is simple to operate and may be readily utilized by the average photographer.

Another object of the present invention is the provision of a testing device which is simple to operate and economical to manufacture and which may be employed with ease by the individual photographer for testing the accuracy of synchronization between a synchronizing mechanism and a camera shutter.

A further object of the present invention is the provision of a testing device for facilitating the rapid checking of the accuracy of the synchronizing speed between a camera shutter and a synchronizing mechanism which may be employed by the average photographer.

Still further objects will become apparent to those skilled in the art by reference to the accompanying drawings wherein:

Fig. 1 is a front perspective view of a conventional type of camera utilizing a photoflash lamp synchronizing mechanism for opening the camera shutter at the peak of maximum intensity from the lamp.

Fig. 2 is a rear perspective view of the camera and synchronizing mechanism as shown in Fig. 1 together with a front view of the testing device of the present invention;

Fig. 3 is an elevational view of a plate as used in the rear of the camera as shown in Fig. 2 and depicts the image as cast upon the plate in one position of the testing device;

Fig. 4 is an elevational view identical to Fig. 3 except depicting the image of another position of the testing mechanism;

Figure 8:
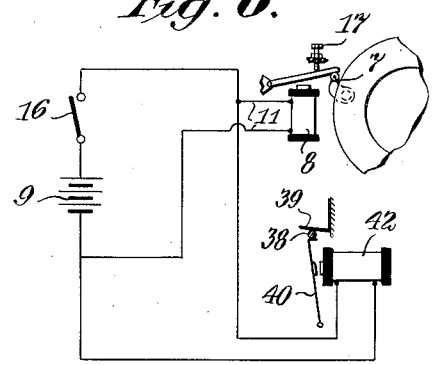
Fig. 8 is a diagrammatic illustration of the electrical circuit employed in conjunction with the testing device of the present invention.

Referring now to the drawings in detail in Fig. 1 a conventional camera 5 is shown which is provided with a shutter 6. Opening of this shutter 6 is effected by tripping of a lever or shutter arm 7. In order to actuate the tripping of the shutter arm a small relay or solenoid 8, adjustably affixed to the camera, is energized by electrical current supplied from a pair of flashlight batteries 9 (Fig. 8). These batteries are enclosed in a metallic casing 10 and connected to the relay by means of a cord conductor 11 having a detachable connector 12. Also supported by the metallic casing 10 is an electrical socket 13 which receives a photoflash lamp 14 and a suitable reflector 15.

When it is desired to take a photoflash lamp exposure and assuming the synchronizing mechanism has been initially adjusted, the photographer merely presses the switch 16. This energizes the photoflash lamp which ignites and after a fraction of a second reaches the peak of its intensity. The relay 8 is simultaneously energized with the photoflash lamp which causes the armature of the relay to be attracted and move the shutter arm 7 followed by complete opening of the shutter 6 and the time required for attraction of the relay armature and movement of the shutter arm is made to correspond to that between initial ignition of the photoflash lamp and the reaching of its peak intensity. Adjustment of the synchronizing mechanism is effected by the adjusting screw 17 which determines the length of movement of the armature of relay 8 and having once been set at the factory must not be disturbed except to readjust the mechanism once it has altered due to shocks or hard usage.

For the purpose of initially adjusting the synchronizing mechanism or readjusting it, the testing mechanism is employed as shown in the remaining figures. This device is connected to the batteries in lieu of the photoflash lamp 14 by the substitution of a suitable connector 18 for the connector 12 and a ground glass plate 19 is placed in the camera instead of the usual photographic plate.

Figure 5:
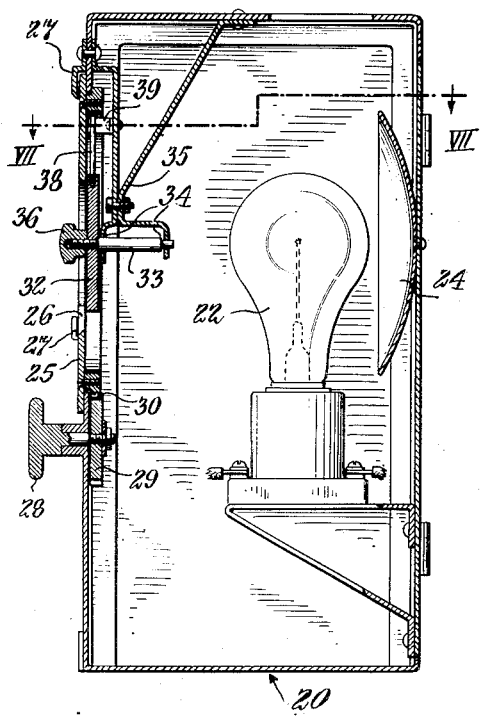
Fig. 5 is a sectional view taken on the line V—V of Fig. 6 of the testing device forming the subject matter of the present invention and as shown in Fig. 2.
Figure 6:
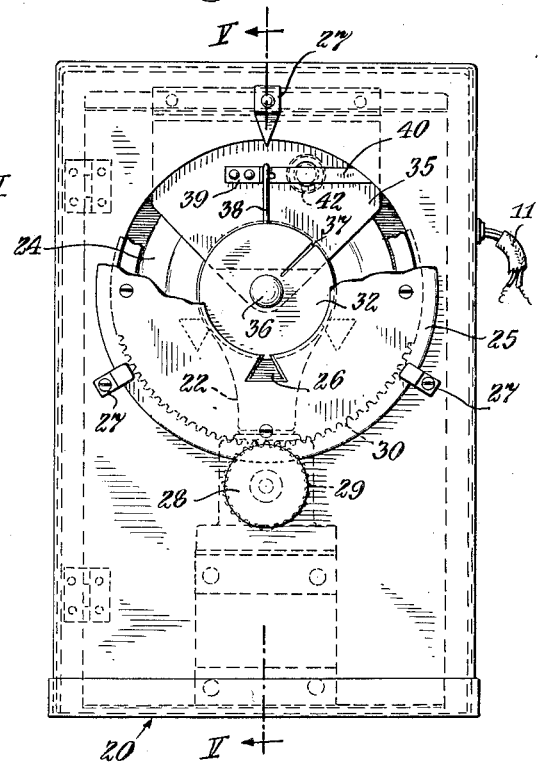
Fig. 6 is a front elevational view of the testing device as shown in Fig. 2 with parts of the device broken away to better illustrate some of the parts.
Figure 7:
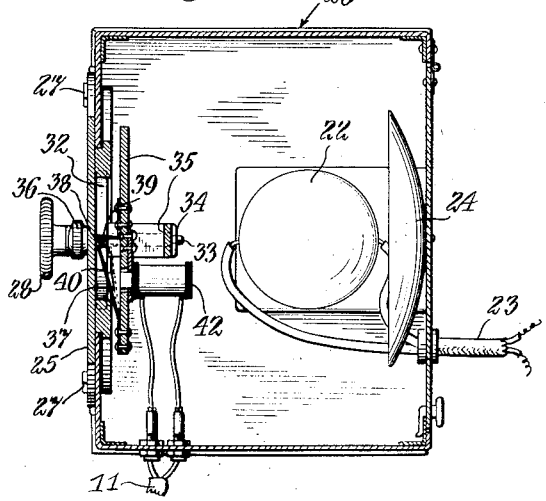
Fig. 7 is a sectional view taken on the line VII—VII of Fig. 5 of the testing device.

The testing device 20, as shown more clearly in Figs. 5, 6 and 7, is provided with an incandescent lamp 22 connected to the usual domestic source of supply by a cord 23 and a suitable reflector 24 may be mounted inside of the device 20, if desired. An open disc 25 provided with a triangular notch or slot 26 is rotatably supported by a plurality of clip supports 27 on the front of the device 20 and may be rotated to bring indicia thereon in alignment with the uppermost clip 27 by rotation of a hand knob 28. This hand knob operates a small gear or the like 29 meshing with teeth 30 on the underside of the disc 25, as shown more clearly in Fig. 6, thus rotating the disc in the desired direction.

Concentric with the disc 25 and recessed within the opening therein is a small disc 32 carried by a short shaft 33 which is journaled in suitable bearings 34 provided in a bracket 35. A small hand knob 36 is also carried by the shaft 33 for rotating the disc 32 and the latter has a notch or slot 37 extending from its periphery toward the axis thereof. A small pin 38 is affixed to the periphery of the small disc 32 and when rotated by the hand knob in a counter-clockwise direction, as viewed from Figs. 2 and 6, bears against a spring 39.

As the disc 32 is rotated the pin 38 rides over the armature 40 of a relay 42 until it contacts the spring 39 and, upon flexing the spring sufficiently to store potential energy therein, the relay armature 40 snaps back and acts as a catch for the pin (Figs. 7 and 8) 38, thus "cocking" the small disc 32 ready for rapid rotation in a clockwise direction upon energization of the relay 42.

In order to adjust the synchronizer, the disc 25 is first rotated by the hand knob 28 to bring one of the indicia on the face of the disc in alignment with the uppermost supporting clip 27 which acts as a pointer. The indicia on the disc are arbitrary graduations representative of maximum opening of the camera shutter relative to the average moment of peak intensity of photoflash lamps of different manufacture and sizes which average is empirically established from flashing some five to ten photoflash lamps. After the average has once been established for a photoflash of given manufacture and size the indicia graduations are indicative of each particular average lamp and once the disc 25 is set at a given graduation need not be further disturbed until resort is made to photoflash lamps of a different manufacture or size.

The testing device 20 is then placed upon a table or the like in proper focus with the camera as shown in Fig. 2. The inner or smaller disc 32 is then "cocked" by rotation thereof in a counter-clockwise direction until the pin 38 contacts the spring 39 and is held firmly under tension, by the relay armature 40. The camera shutter is then opened to its maximum which casts an image on the ground glass plate 19 of the stationary slot 26 in the outer disc 25 as well as the slot 37 of the smaller rotatable disc 32, due to illumination from the lamp 22.

To facilitate observation a small sticker may be pasted on the ground glass plate coinciding with the image of the stationary slot 26. The camera shutter is then closed and the synchronizer ready for testing. Upon depressing the switch 16 energy from the batteries 9 will be supplied simultaneously to the relays 8 and 42 since they are in electrical parallel as shown in Fig. 8. Movement of the armature of relay 8 causes movement of shutter arm 7 with attendant opening of the camera shutter.

At the same time relay 42 is energized and corresponds to energization of a photoflash lamp. The armature 40 is attracted releasing the pin 38 and due to the potential energy of the spring 39 the rotatable disc 32 rotates very rapidly in a clockwise direction. Upon complete opening of the camera shutter an image of the slot 37 in the disc 32 will be cast upon the ground glass plate 19 and the observer or tester notes the relationship of the small slot image with respect to the sticker corresponding to the image of the stationary slot 26. If the image of the small slot 37 with respect to the image of the stationary slot or sticker is, as shown in Fig. 3, this clearly indicates that maximum intensity of the flash occurs after complete opening of the shutter or, in other words, the flash is lagging the shutter opening.

The tester accordingly turns down the adjusting screw 17 which moves the armature of relay 8 closer to its pole piece so that it has less distance to travel and carry with it the shutter arm 7. The synchronizing mechanism is again operated and should observation reveal a relationship of the slot images as shown in Fig. 4, the adjustment screw has been turned down too far since now the shutter opening is leading the flash. A slight loosening of the adjusting screw is then resorted to and the synchronizer again operated until the image of the movable slot 37 aligns perfectly with that of the image of the stationary slot 26, as shown on the plate 19 of Fig. 2, thus showing absolute synchronism between shutter opening and peak intensity of the photoflash lamp.

It should perhaps be again noted that there is a fractional part of a second following closure of the switch 16 during which the usual photoflash lamp ignites and combustion takes place before maximum intensity results. This time lag corresponds to the time required for the rotatable disc to rotate and align its slot with that of the stationary slot in addition to the time required to energize the relay 42. Moreover, since the stationary slot is positioned according to the indicia which is indicative of the average lag of a particular manufacturer's photoflash lamp or of a given size, the device is comparatively very accurate in determining absolute synchronism.

It thus becomes obvious to those skilled in the art that a testing device for accurately testing the synchronizing speeds between a camera shutter and a synchronizing mechanism for igniting photoflash lamps is herein provided which is so simple in its operation that the individual photographer can readily adjust the synchronizing mechanism at all times. Moreover, since the device can be economically manufactured it can be sold to individual photographers so that the necessity for returning synchronizing mechanism to the manufacturer for adjustment is eliminated.

Although one specific embodiment of the present invention has been shown and described it is to be understood that other modifications thereof may be made without departing from the spirit and scope of the appended claims.

What is claimed is:

1. A synchronizing tester for accurately synchronizing the speed of a camera shutter with a synchronizing mechanism normally operative to ignite a photoflash lamp simultaneously with maximum opening of a camera shutter comprising means adapted to be preset to represent complete opening of a camera shutter relative to the moment of peak intensity of a photoflash lamp and provided with a portion for casting an image upon a camera plate when the camera shutter is opened, releasable means cooperating with said first mentioned means and provided with a portion for casting an image upon the camera plate simultaneously with the image cast by said first mentioned means, and means associated with said releasable means and operable by said synchronizing mechanism simultaneously with opening of said camera shutter for releasing said releasable means to enable an observer to determine the relative position of the respective images on the camera plate, and to adjust the synchronizing mechanism until the respective images coincide.

2. A synchronizing tester for accurately synchronizing the speed of a camera shutter with a synchronizing mechanism normally operative to ignite a photoflash lamp simultaneously with maximum opening of a camera shutter comprising a device adapted to be disposed in focus with a camera having a member adapted to be adjusted to a position corresponding to complete opening of a camera shutter relative to the moment of peak intensity of a photoflash lamp and provided with a portion for casting an image on a camera plate upon opening of the camera shutter, a releasable member disposed adjacent said adjustable member and provided with a portion for casting an image on the camera plate simultaneously with the image of said adjustable member, and mechanism carried by said device for normally maintaining said releasable member under tension and operable by said synchronizing mechanism simultaneously with said camera shutter for releasing said releasable member to enable an observer to determine the relative position of the respective images on the camera plate and to adjust the synchronizing mechanism until the respective images coincide.

3. A synchronizing tester for accurately synchronizing the speed of a camera shutter with a synchronizing mechanism normaly operative to ignite a photoflash lamp simultaneously with maximum opening of a camera shutter comprising a device adapted to be disposed in focus with a camera and provided with a source of illumination therein, a normally stationary member adjustable to preselected positions representative of complete opening of a camera shutter relative to the moment of peak intensity of a photoflash lamp carried by said device and provided with an opening therein for casting an image on a camera plate upon the opening of the camera shutter, a rotatable member disposed adjacent said stationary member having an opening therein for casting an image upon the camera plate simultaneously with the image cast by said stationary member, mechanism carried by said device and engageable with said rotatable member for holding the latter under tension preparatory to automatic rotation thereof, and said mechanism being operable by said synchronizing mechanism simultaneously with opening of said camera shutter for causing rotation of said rotatable member to enable an observer to view the relative position of the respective images on the camera plate and obtain an indication of the adjustment necessary for the synchronizing mechanism in order to make the images coincide.

4. A synchronizing tester for accurately synchronizing the speed of a camera shutter with a synchronizing mechanism normally operative to ignite a photoflash lamp simultaneously with maximum opening of a camera shutter comprising a device adapted to be disposed in focus with a camera shutter and provided with a source of illumination therein, a normally stationary disk rotatable to preselected positions representative of complete opening of a camera shutter relative to the moment of peak intensity of a photoflash lamp carried by said device and provided with an opening therein for casting an image on a camera plate upon the opening of the camera shutter, a second concentrically disposed rotatable disk having an opening therein for casting an image upon the camera plate simultaneously with the image cast by said stationary disk, mechanism carried by said device and engageable with said rotatable disk for holding the latter under tension preparatory to automatic rotation thereof, and said mechanism being operable by said synchronizing mechanism simultaneously with opening of said camera shutter for causing rotation of said rotatable disk to enable an observer to view the relative position of the respective images on the camera plate and obtain an indication of the adjustment necessary for the synchronizing mechanism in order to make the images coincide.

5. A synchronizing tester for accurately synchronizing the speed of a camera shutter with a synchronizing mechanism normally operative to ignite a photoflash lamp simultaneously with maximum opening of a camera shutter comprising a device adapted to be disposed in focus with a camera shutter and provided with a source of illumination therein, a normally stationary disk having a slot therein mounted on said device and provided with gear teeth, a control knob provided with a gear meshing with the gear teeth of said disk and operable to rotate said disk to preselected positions representative of complete opening of a camera shutter relative to the moment of peak intensity of a photoflash lamp and for casting an image of said slot on a camera plate upon the opening of the camera shutter, a shaft concentrically disposed relative to said disk and provided with a control knob for rotating said shaft, a second rotatable disk carried by said rotatable shaft having a slot therein for casting an image upon the camera plate simultaneously with the image cast by said stationary disk and said second disk having a radially extending pin, a spring engageable by said pin for placing said rotatable disk under tension preparatory to automatic rotation thereof, and a relay provided with an armature engageable by said pin for holding said rotatable disk under tension and energizable to cause release of said pin with automatic rotation of said rotatable disk simultaneously with opening of said camera shutter, to enable an observer to view the relative position of the respective images on the camera plate and obtain an indication of the adjustment necessary for the synchronizing mechanism in order to make the images coincide.

BYRON L. SMITH.